US010295810B2

(12) United States Patent
Tommei

(10) Patent No.: US 10,295,810 B2
(45) Date of Patent: May 21, 2019

(54) DOMESTIC HELIOSTAT AND METHODS OF MAKING SAME

(71) Applicant: Solenica, San Diego, CA (US)

(72) Inventor: Diva Tommei, Rome (IT)

(73) Assignee: Solenica, Inc., San Diego, CA (US)

(*) Notice: Subject to any disclaimer, the term of this patent is extended or adjusted under 35 U.S.C. 154(b) by 0 days.

(21) Appl. No.: 15/709,300

(22) Filed: Sep. 19, 2017

(65) Prior Publication Data

US 2018/0067293 A1 Mar. 8, 2018

Related U.S. Application Data

(63) Continuation-in-part of application No. 14/874,374, filed on Oct. 2, 2015, now Pat. No. 9,766,439.

(51) Int. Cl.

| | |
|---|---|
| ***G02B 19/00*** | (2006.01) |
| ***G02B 7/182*** | (2006.01) |
| ***G01S 3/786*** | (2006.01) |
| ***F21S 11/00*** | (2006.01) |
| ***F24S 50/20*** | (2018.01) |
| ***F24S 80/50*** | (2018.01) |
| ***F24S 30/45*** | (2018.01) |
| ***F24S 23/77*** | (2018.01) |

(52) U.S. Cl.

CPC ........ *G02B 19/0042* (2013.01); *F21S 11/005* (2013.01); *F24S 23/77* (2018.05); *F24S 30/45* (2018.05); *F24S 50/20* (2018.05); *F24S 80/50* (2018.05); *G01S 3/7861* (2013.01); *G02B 7/182* (2013.01); *G02B 7/1827* (2013.01); *G02B 19/0019* (2013.01); *F24S 2080/503* (2018.05); *Y02B 10/10* (2013.01); *Y02B 10/20* (2013.01); *Y02E 10/47* (2013.01)

(58) Field of Classification Search

CPC ................ G02B 19/0042; G02B 7/182; G02B 19/0019; G02B 26/0816; F21S 11/005; F24J 2/38; F24J 2/506; F24J 2/52; F24J 2/54; G01S 3/7861; G01J 1/20; G03B 21/00; H01L 31/0547

USPC ....... 359/225.1; 353/8; 250/203.4, 203, 201, 250/202, 216, 234, 235, 236; 126/576, 126/689, 270, 271

See application file for complete search history.

(56) References Cited

U.S. PATENT DOCUMENTS

| | | | |
|---|---|---|---|
| 4,283,887 A | 8/1981 | Horton | |
| 4,691,075 A | 9/1987 | Murphy | |
| 7,252,084 B2 | 8/2007 | Pawlenko et al. | |
| 7,887,188 B2 | 2/2011 | Knight | |
| 8,540,382 B1 * | 9/2013 | Hultberg | G01S 3/7861 359/838 |
| 8,569,616 B2 | 10/2013 | Guha et al. | |
| 9,766,439 B2 * | 9/2017 | Tommei | G02B 19/0042 |
| 2003/0136397 A1 * | 7/2003 | Kinoshita | H01L 31/0547 126/600 |

(Continued)

FOREIGN PATENT DOCUMENTS

| | | |
|---|---|---|
| WO | 2011135524 | 11/2011 |

*Primary Examiner* — Frank G Font

(74) *Attorney, Agent, or Firm* — Lewis Kohn & Walker LLP; David M. Kohn; Kari Moyer-Henry

(57) ABSTRACT

A heliostat contained within a mechanical enclosure is described that optimizes the heliostat for domestic applications by emphasizing features of durability, protection from outside weather, low cost of manufacture, self-powering, light-weight, and aesthetics.

19 Claims, 10 Drawing Sheets

12
13
3
6b
7
6a
15
4
8
5
20
9
17
21
18
14
11
29

(56) References Cited

U.S. PATENT DOCUMENTS

| | | | | |
|---|---|---|---|---|
| 2009/0183730 | A1 | 7/2009 | Knight | |
| 2010/0229850 | A1 | 9/2010 | Sankrithi | |
| 2012/0204859 | A1 | 8/2012 | Gandhi | |
| 2014/0293466 | A1 | 10/2014 | Von Kries | |
| 2015/0007673 | A1* | 1/2015 | Hultberg | G02B 5/10<br>74/5.4 |
| 2015/0323772 | A1 | 11/2015 | Serrano Gallar et al. | |
| 2016/0154412 | A1* | 6/2016 | Plourde | F24S 23/74<br>236/101 A |

* cited by examiner

DOMESTIC HELIOSTAT AND METHODS OF MAKING SAME

PRIORITY INFORMATION

This application is a continuation-in-part application of U.S. application Ser. No. 14/874,374, filed Oct. 2, 2015, the contents of which are hereby incorporated by reference herein.

FIELD OF THE INVENTION

The present invention relates generally to the field of heliostats and solar arrays. More specifically, the present invention pertains to a heliostat optimized for domestic lighting use, and a version protected by a mechanical enclosure.

BACKGROUND OF THE INVENTION

As is known, a heliostat is a device used to follow the Sun's path during the span of the day, usually to orient the light thereof towards a precise target thanks to the help of one or more mirrors.

Today heliostats are mostly used in industrial thermodynamic processes to increase the temperature of thermal devices on towers, by the simultaneous use of several heliostats pointing at the same target, which are indispensable to obtain the necessary temperatures for devices that convert heat into electricity.

However, other applications for heliostats may include light-redirection for domestic and city uses, in which the heliostat redirects sunlight towards an object, room, street, monument or piazza to illuminate, brighten and/or warm.

Most sunlight redirection systems in use today are expensive and require intensive and invasive installation procedures that could be obviated by the subtle use of heliostats.

However, if one wanted to use a heliostat as a domestic device to place indoors (on a window sill, kitchen-island, desk, nightstand, wall or ceiling to name a few options) or outdoors (balcony railing or garden for example) in order for such domestic device to be in direct contact with the sun that it then is able to redirect where sunlight is most needed, which could be indoors (on the ceiling to obtain a diffuse lighting effect thanks to the scattering provided by the ceiling material or in specific parts of the building to obtain a task-based lighting effect such as to illuminate a specific area of the building like a desk or a plant) or outdoors (on patios or backyards that are in the shade and require sunlight), the heliostat systems in use today would prove to be rather inadequate. Most heliostats, in fact, focus on emphasizing and optimizing the features that are fundamental in industrial applications, such as pointing accuracy, planarity of the mirror, stability and robustness of the mechanics. But other features become important when developing a heliostat for domestic applications, such as but not limited to compactness, portability, self-powered autonomy, lightness, low maintenance times, low-cost of the entire system and protection from outside weather.

In order to create a heliostat that is optimized for domestic use one needs to revisit the key components that make a heliostat and re-arrange them so that optimization of said domestic features are emphasized.

U.S. Pat. No. 4,192,583 to Horton defines a heliostat assembled within a protective enclosure supported by a foundation mounted in the ground. While this is a means of protection from weather elements, such an enclosure does not allow for the portability required of a heliostat for residential indoor as well as outdoor use.

U.S. Pat. No. 4,283,887 to Horton et al. defines a bubble-like enclosure for a heliostat that is inflated by filling it with pressurized air. Whilst this patent clearly defines a means of protection of the heliostat contained within such an enclosure, it is in no way addressing any of the other features of compactness, portability, self-powered autonomy, low-maintenance time or low-cost. In fact, such a protective structure is intended for larger heliostats that need to be installed on the ground and are supported by a foundation in the form of a soil filled, plastic ring-bag mounted in the ground at the heliostat site.

U.S. Pat. No. 4,620,382 to Sallis teaches an apparatus for pneumatically or hydraulically tensioning a membrane, which stretched membrane can support a reflective surface for use as a heliostat in a solar energy collection system. A disadvantage to this type of heliostat device is the absence of an enclosure to protect the heliostat device from outside elements.

U.S. Pat. No. 4,870,949 to Butler teaches a wind resistant, two axis tracker that is used to direct a solar reflector, heliostat, or dish antenna. An elevation drive ring is supported in a vertical orientation by dolly wheels rotatably attached to a base. The reflector is attached at two points along the circumference of the elevation drive ring. In the preferred embodiment, a reflector having a diameter slightly less than the inside diameter of the elevation drive ring is mounted to the elevation drive ring. A number of support members, such as cables, extend from the elevation drive ring to the periphery of the reflector. Azimuth adjustment is either provided by incorporating a horizontal turntable or drive ring as part of the base, or by pivoting the reflector within the elevation drive ring by adjusting the respective lengths of the support cables extending laterally from the elevation drive ring to the periphery of the reflector. Drawbacks with this type of heliostat device is that it does not include an enclosure to protect the heliostat device and is primarily concerned with using a centerless elevation drive combined with a turntable azimuth drive for reflectors in order to reduce the structure/weight of materials for wind resistance. This may be suitable under extreme conditions, such a design would be impractical and ineffective for the domestic use of a scaled down heliostat device.

U.S. Pat. No. 7,887,188 to Knight, while disclosing a heliostat comprised of a mirror that is placed in two hemispheres that are joined together, wherein the mirror contains a plurality of wheels that run on the inner surface of the sphere so as to move it and orient it towards the target, it manages to maximize the mirror size that can be fitted inside the sphere but completely fails at providing an optically smooth surface for the inbound and outbound sunlight, where by inbound one means the sunlight from the sun to the mirror and by outbound the sunlight reflected from the mirror to the target. Such a hemisphere joint does not allow both inbound and outbound sunlight to enter or exit unhindered from the disclosed enclosure. This would confuse any optical sensor that based its accuracy on the angle created by the incoming and outgoing rays if those rays are deviated in their path by a significant refractivity effect. More importantly, in operation the frictional contact between the wheels and the sphere's inner surface would inevitably start to leave marks on the inner surface and over time these would not only become unsightly, but would also negatively affect the optical performance of the heliostat.

U.S. Pat. No. 8,132,928 to Bronstein et al. describes an improved solar reflector utilizing a tensioned reflective membrane, further including a membrane attached to the outer surface of a metal strap that is positioned on an end form by means of a curved-face tensioning block. While linear tensioned membrane reflectors have some advantages over more rigid structures, such membranes present a variety of problems compared to those reflector technologies using more rigid frames. For example, most membranes utilize certain laminates, such as films, as a substrate for the membrane. Mylar (Biaxially-oriented polyethylene terephthalate boPET polyester film) is a dimensionally stable material that reacts in undesirable ways when the film is placed under compression. A typical means of mounting the membrane is to adhere it to the underside of a metal strap with a structural adhesive, such as epoxy. The strap is then wrapped around the end form and clamped in place. However, as the strap is bent around the end form the strap's inward facing surface and the membranes are placed in compression, wrinkles are produced. Such defects are then crushed and locked in place as the strap is tightened on the end form. These distortions in the film are magnified by the film and transmitted into the membrane as large longitudinal wrinkles and ripples that span across the entire membrane's surface, distorting its shape and resulting in a diminished performance for its intended purpose.

There is a need in the art to provide a solution to the large scale heliostats that are incapable, unsuitable and impractical for domestic use while simultaneously providing for enhanced benefits when compared to the state of the art in heliostats.

SUMMARY OF THE INVENTION

The present invention provides a mechanical enclosure for a heliostat that renders it optimized for domestic lighting use in accordance with the claims of the present invention.

In one embodiment, the present invention provides for a domestic heliostat that encompasses all the characteristics of a domestic object in one compact device, those characteristics being portability, light-weight, self-powering, wireless, sleek design, low maintenance, and resistance to outdoor weather. It is also designed to have a low cost of manufacture. In one aspect, the deleterious effects of weather on the functional components of the heliostat are minimized. In yet another aspect, the design of the present invention greatly reduces the effects of wind-loading on the mirror. These aspects are achieved by enclosing the steerable mirror and its electromechanical control systems inside a transparent enclosure. In a preferred embodiment, the mirror and control system are completely sealed from the outside.

In yet another embodiment, the present invention provides for a domestic heliostat including: a steerable mirror, a mechanical mirror-steering mechanism, a steering control-system, a steering-control sensor, all contained within a mechanical enclosure wherein said mechanical enclosure has a break-line or joint about which said enclosure may be separated into two or more parts. In one aspect, this embodiment is further characterized in that: at least one portion of the mechanical enclosure is in the shape of a portion of a spherical-shell and such portion is made of optically transparent material, further wherein the transparent spherical-shell shaped portion of the enclosure subtends a solid angle at center of said sphere of more than 2 pi steradians. In another aspect, the trajectory of the joint that divides the mechanical enclosure in two parts is optimized to allow the insertion of the largest possible mirror inside the mechanical enclosure so as to maximize the solar energy and illumination reflected on the target, with this optimization being saddle shaped or elliptical. In yet another aspect, the steerable mirror is preferably circular in order to maximize the reflective area that will fit inside the mechanical enclosure, which is preferably spherical in shape, and said steerable mirror has a radius that is smaller than the inner radius of the spherical portion of the mechanical enclosure. In yet another aspect, the steerable mirror is rotatably mounted about two axes that intersect at or near the geometric spherical center of the spherical portion of the mechanical enclosure. In a further aspect, the steerable mirror is mounted such that its reflective surface over a major portion of its steerable rotatable position range, faces said spherical portion of enclosure made of optically transparent material. In another aspect, the steering-control sensor is fixed to the inner surface of the mechanical enclosure. In yet another aspect, the heliostat is electrically self-powered.

In an alternative embodiment that retains all the characteristics of portability, light-weight, self-powering, wireless, sleek design, low maintenance, resistance to outdoor weather and low cost of manufacture, the present invention provides for a domestic heliostat including: a steerable mirror contained within a mirror holder, a mechanical mirror-steering mechanism, a steering control-system, a steering-control sensor, a semicircular arcuate slider at the end of which the steering-control sensor is fixed, and a base. The slider may be manually adjusted to alter the height of the steering-control sensor to allow for easy target pointing setup by the user. Since the slider is preferably not connected wirelessly to the steering control system contained within the base of the device, a cable connecting the sensing system placed at the top of the slider that faces the reflecting surface of the mirror, to the steering control system contained within the base, has a length that allows the slider movement between the two most extreme positions of the slider, said positions corresponding to the cable being at its tightest and loosest. In addition to cable length, said positions are defined by the extent of a slot that runs along part of the centerline of the slider the slot additionally functioning as a secure place for the cable to be tucked into during windy days and also and especially as an end-stop. In yet another aspect, the mechanical mirror-steering mechanism is preferentially a forked member comprised of a substantially vertical axis perpendicular to the ground and two arcuate opposed arms at least one of which holds a motor at its top that facilitates a tilting motion of the steerable mirror contained within the steerable mirror holder. In yet another aspect, the steerable mirror is preferably a circular shape in order to maximize the reflective area that will fit into said arcuate forked members of the mechanical mirror-steering mechanism and it is contained within a mirror holder to protect its edges. In yet another aspect, the steerable mirror holder is rotatably mounted about two axes that intersect at or near the geometric center of the mirror. In a further aspect, the steerable mirror holder is mounted such that its reflective surface over a major portion of its steerable rotatable position range faces the photosensitive active part of the steering-control sensor at any mechanically allowable height of the semicircular slider on which the sensor is mounted.

In one aspect, this embodiment is further characterized in that: the mechanical design is optimised to achieve maximum foldability of the device by moving the mirror to a position where the plane defined by the mirror surface is parallel to (or as close to parallel to as possible) the plane defined by the semicircular arcuate slider. Since the two planes are as close to parallel as allowed by the mechanical elements of the embodiment, the total volume that is required to contain the embodiment is minimized, and in fact the required volume is very much less than that of a sphere with the same diameter as the mirror holder, thereby significantly decreasing shipping costs and product-storage costs. In another aspect, the mechanical design of the present invention is optimized to achieve the maximum range of motion of the mirror of the heliostat, which is an important factor in determining the fraction of a day that the target remains illuminated by reflected sunlight. In a preferred embodiment, the heliostat of the present invention positions its mirror such that a normal to the mirror-centre bisects the angle formed by the Sun's position (which changes constantly because of the Earth's rotation), relative to the heliostat's position and a target's position and such that the normal lies in the plane formed by the centre of the Sun, the centre of the mirror and the centre of the target. The design of the mechanical components as described in the present invention allows for all mirror positions to remain unhindered and unobscured by any other heliostat component except for a portion of the slider and the steering-control sensor, which necessarily always need to be in front of the mirror, thereby allowing the maximum fraction of day of sunlight illumination of the target. In yet another aspect, the design of the present invention is optimized for unlimited scalability in that those components that need to scale as the mirror size is changed (e.g. primarily the mechanical support and mechanical steering components) can be sized up or down in relation to the diameter of the mirror while still allowing the mirror to rotate completely unhindered. The design of the present invention accounts for such scalability by having two mounting rotational joints, one on each side of the mirror with one joint always being actuated and the other joint preferably passive, but which may optionally be actuated by a second motor if necessitated by the weight of the mirror.

In yet another aspect, the heliostat is electrically self-powered. Preferably the electrical self-power is provided by one or more photovoltaic-cells. Preferably the one or more photovoltaic-cells are co-mounted with the mirror on the steerable member so as to always face the sun when the heliostat is operative. Preferably the one or more photovoltaic-cells are mounted behind an unsilvered portion of the mirror backing (glass or plastic) to provide them with environmental protection.

The purpose of the design of the present invention is to provide a device to move its mirror in such a way that the reflection of the Sun's light from the mirror is directed to a specific target, regardless of the Sun's position as changed by the Earth's rotation during the day whenever the Sun is visible at the heliostat. To this end, the mirror must be able to move in at least two axes preferably perpendicular to each other which preferably intersect at the mirror's center. Assuming that the heliostat of the present invention is positioned on a horizontal surface, one axis is preferably mainly horizontal and passes through two mounting rotational joints, one on each side of the mirror. One joint is actuated and the other joint is preferably passive, but may also be actuated if required. The second axis is preferably mainly vertical and preferably orthogonal to the first axis and preferably passes through the center of the mirror as well as the rotational joint in the center of the mechanism that supports the mirror. Using motors in these joints, the mirror can be rotated at will about the two axes. The mirror can be moved to all the required positions to reflect sunlight from a moving Sun to a specific target. The control of targeting of the Sun's reflection is achieved by using a sensing system. The sensor system is mounted on a sliding mechanism.

In another aspect, the present invention provides for a low voltage electrical device. The integrated electronics, sensors and motors are powered by a rechargeable battery. The battery is re-charged using a small solar panel located on the mirror assembly.

Another embodiment of the present invention describes a mechanical enclosure for a heliostat characterized in that the spherical portion of the mechanical enclosure of said heliostat is greater in solid angular extent than a hemisphere and preferably greater in solid angular extent than five-fourths of a hemisphere and, preferably, in at least one dimension that subtends an angle of as much as 270 degrees at the center of the sphere. In one aspect, the joint trajectory that divides the mechanical enclosure in two parts additionally allows for the insertion of a mechanical mirror-steering mechanism and steering control-system into said enclosure whereas said joint trajectory is elliptical, or is saddle shaped and it does not intersect the portion of the mechanical enclosure which is substantially spherical in shape and is made of optically transparent material. In another aspect, said joint trajectory is chosen such as to leave as great an area as possible, and possibly all, of the substantially spherical portion of transparent enclosure unbroken.

In another embodiment, the electrical self-power that powers the mirror steering mechanism and control system of the heliostat is provided by one or more first photovoltaic cells, wherein the first photovoltaic cell(s) are located within the mechanical enclosure, which is provided with a transparent window wherein the first photovoltaic cell(s) are positioned so as to be visible to the outside through the transparent window. In one aspect, this window may be partly or wholly provided by the spherical portion of the mechanical enclosure that is made of optically transparent material. In another aspect, these first photovoltaic cell(s) are mounted co-moving with the steerable mirror such that their optically sensitive surface(s) face substantially in the same direction as the reflective surface of the steerable mirror.

In a preferred embodiment, the electrical self-power that powers the mirror steering mechanism and control system of the heliostat is provided by one or more first photovoltaic cells, wherein the first one or more photovoltaic cell(s) are mounted co-moving with the steerable mirror such that their optically sensitive surface(s) face substantially in the same direction as the reflective surface of the steerable mirror. In one aspect, these first one or more photovoltaic cell(s) are mounted in substitution of a portion of the reflective surface of the mirror or on top of it, wherein the first one or more photovoltaic cells(s) are positioned so as to be adjacent to the perimeter of the steerable mirror and never large enough to cover the mirror's central region defined as a circular patch centered on the mirror's center with radius at least 10 millimeters, and preferably 50 millimeters and more preferably still at least 80 millimeters. In yet another aspect, these first one or more photovoltaic cell(s) may be covered by an optically transparent material which is part of the mirror transparent material or as a protective additional, transparent and separate cover.

In yet another embodiment of the present invention, the steering-control sensor is fixed to the inner surface of the mechanical enclosure and is positioned such as to minimize its obstruction to the passage of light from the sun to the heliostat's target, and preferably below the horizontal mid-line plane of said mechanical enclosure. In one aspect, the steering-control sensor may be powered by the first photovoltaic cells, but is preferably self-powered independently of the heliostat's electrical self-power, and is preferably self-powered by one or more second photovoltaic cells co-mounted with the steering-control sensor. In another aspect, these second photovoltaic cell(s) are mounted such that their optically sensitive surfaces face towards the zenith. The steering-control sensor preferably communicates with the steering control-system wirelessly via an infra-red (IR) link or a radio link. Optionally, the steering control sensor communicates with the control system via a wired connection.

In one aspect, the steering-control sensor is comprised of a front and a back cover that could also be a left and a right cover or a top and a bottom cover, and a low-cost camera element. The front of the cover is fitted with an optically transparent aperture which is nevertheless weather-resistant, for example, a glass or polycarbonate window, the aperture allowing light to reach the camera within the covers. Preferably, the camera element is comprised of a photosensitive surface and an electronics control system placed at the back of the photosensitive surface of the camera and enclosed within the covers. The electronics control system is preferably comprised of a low-cost microprocessor and one or more light sensors, preferably at least 2 and more preferably at least 3, that are internal to the steering-control sensor and are pointing radially outwards in directions approximately normal to the pointing direction of the camera, and distributed preferably equi-angularly around the perimeter of the electronics control system with their sensitive surfaces facing outwards through transparent apertures in the housing. The light sensors can specifically be infrared sensors, UV sensors or visible spectrum sensors. The steering-control sensor preferably comprises low voltage circuitry and preferably an accelerometer. The purpose of the light sensors is for steering-control sensor to be able to determine the initial position of the Sun when its reflection is not positioned within the field of view of the camera. By roughly determining the position of the Sun with respect to the heliostat using the light sensors, the steering mirror can be moved in a way that the Sun's reflection moves inside the field of view of the camera. This initial movement controlled by the light sensors is referred to as pre-alignment, and it precedes the high-accuracy positioning controlled using the camera which results in the reflection of the Sun's light being held precisely at a specific location throughout the day. Preferably a camera filter is placed between the front of the cover and the light entrance aperture of the camera element, or alternatively within the camera element itself in front of the light-sensor surface, making the combination of low-cost camera, low-cost microprocessor and filter a low-cost stand-alone system for accurately detecting the position of the Sun.

The steering-control sensor is preferably powered by the one or more first photovoltaic cells but may also or alternatively be self-powered by one or more second photovoltaic cells co-mounted with the steering-control sensor. In another aspect, the one or more second photovoltaic cell(s) are mounted such that their optically sensitive surfaces face towards the zenith, and positioned such that they do not obscure either the camera or the light sensors. In another aspect one or more of the second photovoltaic cells may substitute for one or more of the light sensors and thus be used both to self-power the steering-control sensor as well as to form part of the pre-alignment control system. The steering-control sensor preferably communicates with the steering control-system via a wired connection. Alternatively, the steering control sensor communicates with the control system wirelessly via an infrared (IR) link or a radio link.

In another embodiment, the mechanical mirror-steering mechanism and the steering control-system are both mechanically mounted on the rear (non-reflective side) of the steerable mirror and are substantially hidden from sight of external viewers by the non-transparent sections of the heliostat's mechanical enclosure and/or by the steerable mirror. Alternatively, the mechanical mirror-steering mechanism is preferably attached to the mechanical enclosure at substantially one position only on a non-transparent portion of the mechanical enclosure.

In an alternative embodiment, the mechanical mirror-steering mechanism is comprised of a forked member that contains two opposed mounting points at the two ends of the tines of the fork between which a steerable mirror firmly contained within a mirror holder is rotatably positioned preferably along or close to a diameter of the mirror which is preferably substantially horizontal, and a vertical axis that connects the conjunction of the fork tines to a base. The two mounting points are connected to the vertical axis through two preferably arcuate arms comprising the tines of the fork. The arms wrap around but preferably do not contact the preferably circular steerable mirror positioned in between them. The steerable mirror is rotatably connected to each mounting point via a rotatable joint or bearing positioned so as to have its rotational axis along the line through the two mounting points. At least one rotatable joint or bearing each comprise one of the bearings of a mirror-motor, which provides for a motor capable of driving the mirror about the axis between the bearings. Preferably the one or two mirror-motors is a geared motor. Preferably the one or two mirror-motors is a low-voltage direct current motor. This allows for controllable rotation of the steerable mirror contained within the mirror holder around the axis of the rotatable joints or bearings in any rotatable position. The one or more mirror-motors and bearings or rotatable joints are contained within enclosures and one of the two enclosures contains a power button and one of the two enclosures contains a rotational encoder sensor attached to both the mounting point and the steered mirror so as to sense its rotational position. In an alternative embodiment one of the two tines of the forked member is not present and the mirror is supported by a mirror-motor and one or more bearings or rotatable joints on just one side of the rotation axis, the mirror then being supported essentially by a cantilevered stub-axle protruding from the one mirror-motor. The rotational encoder sensor is then mounted on this same mirror rotational axle axis. In yet another alternative embodiment in which the mirror size is larger and the weight to be moved by the mirror-motor heavier, it is preferable to have both tines of the forked member containing a mirror-motor, which can result in lower cost than having one larger mirror-motor placed on one of the two tines, and safer because one larger mirror-motor may make the whole system heavier on one side and unbalanced and therefore more likely to tip over.

Preferably, the vertical axis of the forked member comprises a base-shaft which is rotatably mounted on a base-bearing (which may be implemented as a rotational joint) fixed to a base, said base being the structure upon which the entire device stands and this base structure also has a pin preferably positioned on its bottom side whereby a mounting arm latch can be fixed so as to allow the user to extend the heliostat's reach as well as allowing additional options other than just sitting on a horizontal surface. The optional mounts allow the heliostat to be mounted on railings, poles, windowsills and walls provided the mounts have a clamp on the other end that can safely fix to all these surfaces. The base-shaft is actively rotatably driven by a base-motor, a motor capable of rotating the whole mirror mounting assembly above it. The base-motor is preferably a direct current motor and is preferably a geared motor. The base-bearing is preferably comprised of one of the bearings of the base-motor. The base comprises an enclosure into which is mounted the base-motor and the steering control system and optionally a battery to store energy from the first and/or second photovoltaic cells, the stored battery energy then being used to power the heliostat at times when the photovoltaic cells are unable to deliver adequate power by themselves, for example overnight (when at least some monitoring activity may be required) or on cloudier days.

Preferably, the steering control-system is located within the base. Each of the motors and the steering control-system are substantially hidden from sight of external viewers by the non-transparent sections of their respective enclosures. Additionally, the mechanical mirror-steering mechanism is preferably attached to the base at substantially one position only on a non-transparent portion of the base. The one or two mirror-motors of the mechanical mirror steering mechanism and the steering control system located in the base are preferably interconnected through a wired connection but can also be interconnected wirelessly.

In yet another embodiment, a semi-circular arcuate slider passes through the base via a first arcuate slot positioned at any height of the base but is preferably positioned in the higher third of the base. The arcuate slider is preferably positioned such that the axis of the circle of which the arcuate slider forms an arc, is parallel to the horizontal rotational axis of the mirror, i.e. the axis driven by the mirror-motor(s). Preferably the slider axis is coincident with the horizontal axis of the mirror. Preferably the arcuate slot passes through the vertical rotation axis of the steerable mirror so that the center of rotation of the arcuate slider corresponds to the intersection of the horizontal and vertical rotational axes of the steerable mirror. Where the arcuate slot is positioned such that it passes through the mechanical vertical axle of the base-motor supporting the mirror, then the slider is penetrated by a slot along its centerline through which the vertical supporting axle passes freely, thus allowing independent positioning of the slider without interference with said axle except at the two extremes of the slider position, which are determined by the ends of the slot and thus act as end-stops. A mechanical clamp which is preferably a friction-clamp or more preferably a user-operated screw or lever or cam clamp is mounted in the base adjacent to or around a region of the arcuate-slot in the base to firmly hold the slider in position but which also may be easily adjustable by hand (by the user) when the clamp is released which facilitates the sliding of the arcuate slider so that it may be positioned as desired by the user and then be firmly fixed in any suitable desired position along its allowable path. As described above a slot pierces the middle of the slider so that the slider is allowed to move within the base in a sliding motion driven by the user and, preferably, the slot runs through the longitudinal midline of the slider and is placed in the central region of the extent of the arc defined by the slider. Such slot is a form of end-stop because it defines the limit positions of movement of the slider. To prevent damage during the slider movement to the cable connecting the steering-sensor at the top of the semi-circular slider to the steering control system contained within the base, the length of the cable is at least equal to the length of the slot in the slider. In yet another embodiment, the steering control mechanism is remotely controllable without a wired link, via a radio link (e.g. WiFi or Bluetooth), an infrared (IR) link, or an acoustic link that is preferably ultrasonic.

In yet another embodiment, where a mechanical enclosure is provided, the steering control mechanism is remotely controllable from outside of the mechanical enclosure preferably without a wired link, via a radio link (e.g. WiFi or Bluetooth), an infrared (IR) link, or an acoustic link that is preferably ultrasonic.

In an alternative embodiment, the mechanical enclosure is substantially rigid, is substantially sealed from the external environment and is preferably hermetically sealed, is preferably provided with a desiccator element, such as silica gel, and is made of material(s) that is substantially shatter-proof and preferably a category of plastics materials, e.g. methacrylate polymers or polycarbonate. The overall size of the mechanical enclosure is optimized for domestic lighting use; the largest dimension of the mechanical enclosure is preferably not less than 20 cm and preferably not more than 100 cm, and more preferably not more than 60 cm.

In an alternative embodiment the base is a cylinder of height 11 cm and diameter 12 cm, preferably less than 15 cm in diameter, and more preferably less than 10 cm in diameter that effectively can be extended in diameter by the addition of a circular flat disc attachable to the bottom of the base.

In another embodiment the base is composed of multiple vertical sections with at least two sections that allow access to the steering control system through a rotation or snapping motion allowing the removal of the lowest section, whereupon WiFi add-on modules and/or extra sensor units can be inserted. Preferably such add-on modules electrically connect to the control system in the base via an embedded electrical connector exposed to the lower surface after removal of a connector-sealing cover.

In yet another embodiment, all of the internal components to the mechanical enclosure are preferably chosen to be of lighter construction than would be required to withstand normal outdoor wind loading in the absence of the enclosure, and the thickness of the steerable mirror is preferably chosen to be substantially less than the minimum thickness of the mirror that would be required to avoid substantial bending were the mirror to be exposed directly to normal outdoor wind loading. Similarly, the mechanical mirror-steering-mechanism is chosen to have substantially smaller holding torque than would otherwise be required were said steerable mirror to be exposed directly to normal outdoor wind loading. In this way, much lighter and cheaper components may be used to build a well-functioning heliostat by minimizing their strength or torque specifications through shielding of the components from wind loading by the mechanical enclosure.

In an alternative embodiment the mirror is a shatter-proof and/or toughened glass mirror and is at least 2 mm in thickness.

In another embodiment, the external shape of the mechanical enclosure is such as to provide low wind-loading torque on the mechanical enclosure when exposed to winds coming from any horizontal direction. In one aspect, the external shape of the mechanical enclosure is preferably an ellipsoid with one axis in the vertical direction or more preferably is a spheroid or sphere. In another aspect, the material of the transparent portion of the mechanical enclosure is thin enough to prevent significant refraction errors of pointing and is not more than 10 mm thick, and preferably not more than 5 mm thick, and most preferably not more than 2 mm thick. In another aspect, the material of the transparent section of the mechanical enclosure is sufficiently optically smooth to prevent optical aberrations from significantly degrading the heliostat pointing precision and is preferably optically smooth to at least 10 microns, and more preferably to 5 microns, and even more preferably equal to or better than 1 micron.

In an alternative embodiment the design allows for foldability therefore enabling a wind-safe position when wind loads or bad weather require it. Preferably the aerodynamic design of the steerable part of the heliostat is such as to assist automatic self-folding under strong external wind forces. Preferably external wind forces are sensed by the steering-control system and when they exceed certain safe limits the control system automatically drives the mirror position so as to minimize the sensed wind forces. The wind forces may be sensed directly by an additional wind-sensor, or preferably instead of or as well as by sensing the holding and/or driving torque in the two or more motors required to move the mirror. Preferably where an accelerometer is part of the sensor-control system then the acceleration data from the accelerometer is used in conjunction with any other available wind-force sensing signals in determining whether or not safe limits are exceeded and thus automatically folding the heliostat to a minimal wind-force position.

In another embodiment, the steerable mirror is selected from the group consisting of a plane mirror, a concave mirror and a convex mirror.

DETAILED DESCRIPTION OF THE INVENTION

Figure 1:
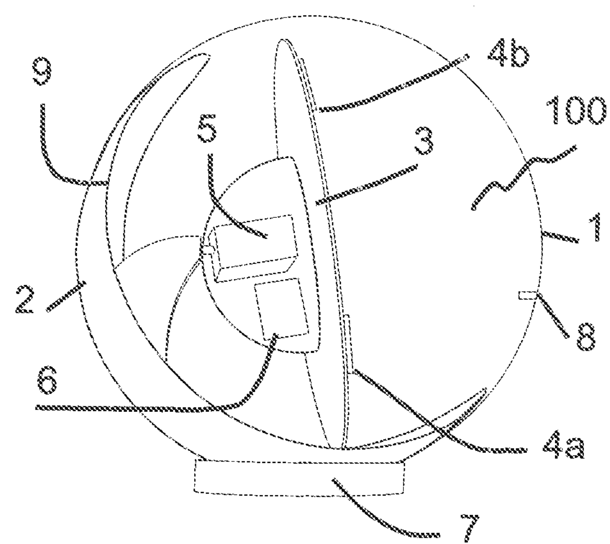
FIG. 1 depicts a side view of the mechanical enclosure containing the heliostat of the present invention.

The present invention provides for a domestic heliostat providing for all the benefits of a full scale version without the ensuing disadvantages of same.

To minimize the deleterious effects of weather, for example, on the functional components of a heliostat, and also to greatly reduce the effects of wind-loading on the mirror, the present invention provides for the steerable mirror and its electromechanical control systems being inside a transparent enclosure, preferably completely sealed from the outside. In an alternative embodiment the present invention is comprised of a steerable mirror and its electromechanical control systems that are not inside an enclosure at all.

To allow the heliostat of the present invention to track the Sun across the greatest possible angle (e.g. from sunrise to sunset) it is important to maintain a clear, unobstructed and continuous optical path through the enclosure both for the Sun's rays to enter, be reflected off the mirror, and exit to the target of the heliostat. It is also important that the optical sun-sensor component that allows automatic steering of the heliostat as the Sun moves has a continuous and unobstructed view of the sun through the enclosure over its full steering angle. In an alternative embodiment the clear unobstructed view is guaranteed by the absence of any enclosure that stands in the way of the Sun's rays hitting the reflective surface of the mirror and then bouncing to the target. Such alternative embodiment allows for a continuous and unobstructed view of the Sun in the absence of an enclosure.

These requirements suggest a spherical-shell transparent enclosure as providing for the optimal design. Since the steering angle can be as much as 90 degrees, and since the mirror itself subtends nearly 180 degrees of such a spherical housing, it is preferred that a nearly 270 degree, unobstructed section of spherical-shell housing is desirable.

To maximize the reflective capability of the mirror within the heliostat of the present invention, it is desirable to make the size of the mirror as large as possible, and for a spherical housing, such a maximum mirror size corresponds to a circular mirror of diameter just less than the inner-diameter of the spherical-shell (to allow clearance when the mirror moves within the shell). In order to fit such an optimally sized mirror inside the spherical housing, one proposed solution provides for a division of the spherical shell into two hemispheres, which allows the mirror to then be assembled to its mountings within the shell, after which the two halves of the shell can be closed.

However, if the spherical housing is split into two hemispheres, there will always be some portion of the path of the sun's rays throughout the day, through the housing onto the mirror and off the mirror and out of the housing to the target, that goes through the hemispherical joint, and this will both scatter the incoming and/or outgoing light, and also seriously affect the correct operation of the optical sun-sensor. It is one of the intentions of the present invention to eliminate this problem of the optical path of the enclosed heliostat being corrupted by joint lines in the housing, by a preferred embodiment of spherical-shell housing geometry.

In practice the trajectory of the joint that divides the mechanical enclosure in two parts (and which effectively defines the shape of the aperture through the spherical shell) is optimized to allow the insertion of the largest possible mirror inside the mechanical enclosure so as to maximize the solar energy and illumination reflected on the target, to allow clearance of any components (e.g. for sensing and/or steering fixed to the front or rear of the mirror while inserting the mirror), and to allow adequate access for assembly of the internal components of the heliostat. This optimized shape essentially forms a slot in the spherical-shell housing and two preferred embodiments of the near-optimized shape for the aperture are saddle shaped or elliptical shaped.

With reference to FIG. 1, the present invention provides for a domestic heliostat in a mechanical enclosure 100, a substantially spherical and transparent front hard shell 1, and a not necessarily spherical and preferably not transparent rear shell 2, joined together by a joint or break-line 9 in the shape of a saddle in this particular embodiment.

FIG. 1 further indicates a steering control sensor 8 sited on the inside of the front hard shell 1, and that the rear shell 2 rests on a stand 7 and supports internally a rigid circular steering mirror 3 with two attached photovoltaic cells 4*a* and 4*b*. A mechanical mirror-steering mechanism 5 and a steering control system 6 can also be preferably mounted to the rear of the mirror.

Figure 2A:
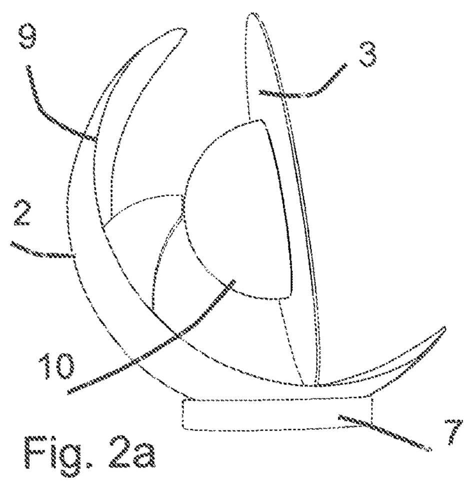
FIGS. 2*a*-2*c* depict a variety of lateral views of the inside of the rear shell and steering mirror. (2*a*) an internal side view of the rear shell with steering mirror; (2*b*) a rear perspective view of the rear shell of the mechanical enclosure with steering mirror; (2*c*) a top perspective view of the rear shell with steering mirror.
Figure 2B:
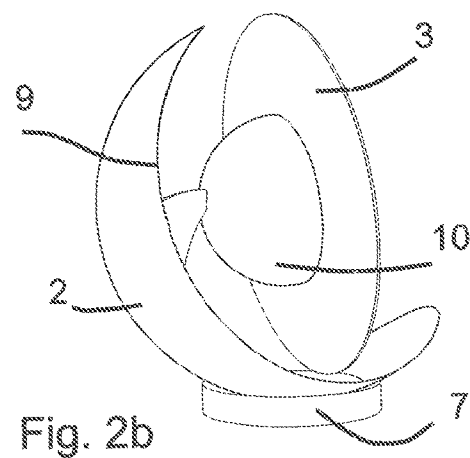
Figure 2C:
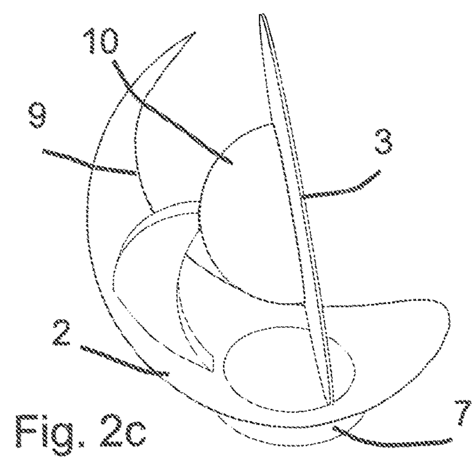

As observed in FIG. 2*a*, the present invention provides for a rear shell 2 of mechanical enclosure 100 comprised of a steering mirror 3, a housing 10 where mechanical mirror-steering mechanism 5 (not shown) and steering control system 6 (not shown) are housed, and stand 7. FIG. 2*b* shows a rear view of the rear shell 2 of mechanical enclosure 100 comprised of the steering mirror 3, the housing 10 and the stand 7. FIG. 2*c* shows a top perspective view of the rear shell 2 comprised of the steering mirror 3, the housing 10 and the stand 7. In each of the above described figures, the saddle shaped break-line 9 defines the perimeter of rear shell 2.

Joint or break-line 9 allows this particular embodiment to maximize the optically smooth area of front transparent hard shell 1 available in front of the steering mirror 3 by retaining a saddle shape that at the same time is able to maximize the size of the steering mirror 3 that may be fitted within it. With the trajectory of the break-line 9, the front transparent hard shell 1 of mechanical enclosure 100 is extended enough so as to allow the unobstructed entrance of sunlight through the front transparent hard shell 1 towards the steering mirror 3 and its ensuing exit via reflection of sunlight from the steering mirror 3 through the front hard shell 1 towards the target (not shown), over a very wide range of mirror steered positions. In situations in which the steering mirror is laterally rotated to its maximum—such as sunrise and sunset in the most densely occupied regions of the northern hemisphere—the steering mirror 3 will have a clear view of the sky through the transparent front hard shell 1, unhindered by the joint or break-line 9 that must necessarily be present in order for the steering mirror 3 to be fitted inside the mechanical enclosure 100 during manufacture and for maintenance.

The steering control sensor 8 is situated on the front transparent hard shell 1 in front of steering mirror 3 so as to receive the reflected sunlight from the steering mirror 3 (outbound light) and hide as little as possible of the steering mirror 3 reflective surface from the target. Steering control sensor 8 is, in this particular embodiment, wirelessly connected to steering control system 6 through a pulsed-IR system (not shown) and powered by separate co-located photovoltaic cell(s) (not shown). In an alternative embodiment, steering control sensor 8 is wirelessly connected to steering control system 6 by means of a radio transmitter at the sensor and a radio receiver at the mirror steering motor controller. This radio system could be a WiFi- or Bluetooth-enabled module, or something much simpler and cheaper, as the data rate required is very low. The radio transmitter and receiver are each powered by separate co-located photovoltaic cells. Where WiFi or Bluetooth modules are fitted within the heliostat of the present invention, whether or not they are used for communication internally within the heliostat, they can be used to transmit data generated by but not limited to the steering control sensor 8, steering control system 6 and mechanical mirror-steering mechanism 5, to an external server or smartphone. Similarly, the present invention provides for the reception by the heliostat of control instructions and data from an external device such as a smartphone.

In another alternative embodiment, steering control sensor 8 could be physically connected to steering control system 6 by means of a wired connection. While this direct wired approach is simple and potentially very low cost, there are mechanical problems to be overcome with relative movement between the two ends of the connecting cable, as well as aesthetic issues with the visible wires, which makes the wireless approach more preferred.

The mechanical mirror-steering mechanism 5 contains all the gears and motors (not shown) capable of directing and moving the steerable mirror 3. Similarly, the steering control-system 6 contains all the electronics that dictate the movement of the steerable mirror 3 through the mechanical mirror-steering mechanism 5. In a preferred embodiment, the steering control system 6 is wirelessly connected to the steering control sensor 8 so as to accurately guide the movement of the steering mirror 3. In another embodiment, the connection between steering control system 6 and steering control sensor 8 is made wirelessly by means of a radio transmitter and receiver, which may be, for example, a WiFi- or Bluetooth-enabled module or a very simple low-data-rate radio system, or physically by means of one or more wired connection(s). Such a WiFi or Bluetooth module allows data collected by but not limited to the steering control sensor 8, steering control system 6 and mechanical mirror-steering mechanism 5, to be transmitted to an external server or a smartphone, as well as to allow the reception by the heliostat of control instructions and data from an external device such as a smartphone.

As further described in FIGS. 1 and 2*a*-2*c*, the circular steerable mirror 3 is mounted on two axes around which it is rotatably mounted, that intersect at or near the geometric spherical center of the transparent front hard shell 1. This allows the steering mirror 3 to be able to rotate freely without impacting the transparent front hard shell 1, the rear shell 2, or the stand 7.

The shape of housing 10 is not limited to a hemisphere, as represented in the present embodiment, but could be any geometrical shape or combination of shapes, including but not limited to, two hemispheres. Housing 10, the mechanical mirror-steering mechanism 5 and the steering control system 6, are connected to the mechanical enclosure 100 through a single point of contact that lies on one of the two axes of rotation.

Two photovoltaic cells 4*a* and 4*b* that accumulate the power for the steering control system 6 to move the steerable mirror 3 through the mechanical mirror-steering mechanism 5, are fixed to the surface of the steerable mirror 3, or onto an outer frame around the mirror that extends beyond the perimeter of the mirror's reflective surface. This location allows the photovoltaic cells 4*a* and 4*b* to always move jointly with the steerable mirror 3, which avoids shadowing of the steerable mirror 3 by the photovoltaic cells 4*a* and 4*b* and, at the same time, enables the photovoltaic cells 4*a* and 4*b* to always be oriented towards the sun, because the steering mirror 3 is oriented towards the sun automatically by the steering control system 6.

The mechanical enclosure 100 includes a stand 7, which can have different shapes according to its installation including, but not limited to, a flat foot for desk mounting, or a railing clasp for mounting on a balcony.

Figure 3A:
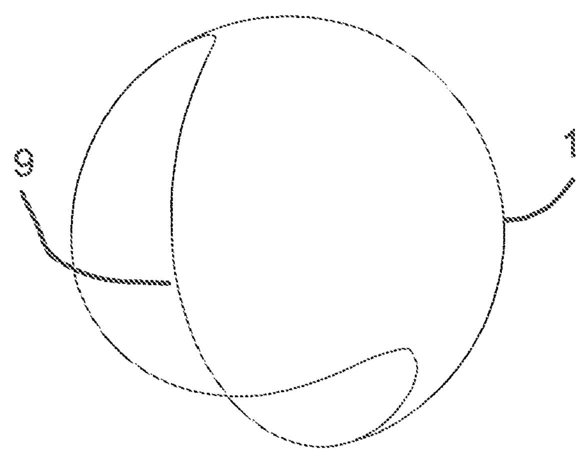
FIGS. 3*a*-3*b* depict a variety of views of the front transparent hard shell. (3*a*) side view of the front transparent hard shell with break-line being centered in view; (3*b*) an alternative perspective view of the front transparent hard shell.
Figure 3B:
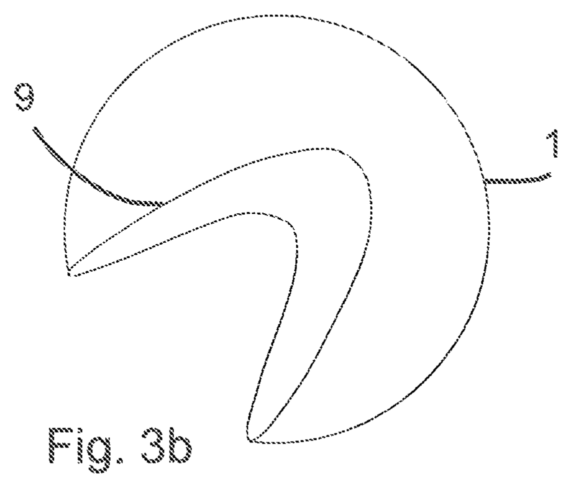

In accordance with FIGS. 3*a* and 3*b*, the trajectory of joint or break-line 9 that divides in two the mechanical enclosure 100 is saddle shaped so as to minimize the optical aberrations experienced by the sunlight coming into and going out of after being reflected off of the steering mirror 3, the mechanical enclosure 100, while maximizing the size of the steerable mirror 3 and thus the solar energy and illumination delivered to the target.

FIG. 3*a* shows a side view of the transparent front hard shell 1 of the mechanical enclosure 100, whereby the joint or break-line 9 is central and part of the internal surface of the transparent front hard shell 1 can be seen as well. FIG. 3*b* shows a rotated side view of the transparent front hard shell 1 of the mechanical enclosure 100, whereby the joint or break-line 9 is clearly defined and again part of the internal surface of the transparent front hard shell 1 can be seen.

Figure 4A:
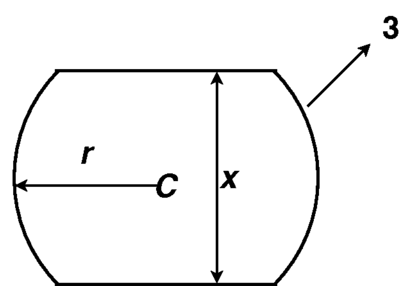
FIGS. 4*a*-4*b* show the central mirror having chord defined segments. (4*a*) mirror having chord defined segments removed from two edges where $x<2r$ or x is smaller than the diameter of the circular mirror; (4*b*) bottom view of transparent hard shell with break-line.
Figure 4B:
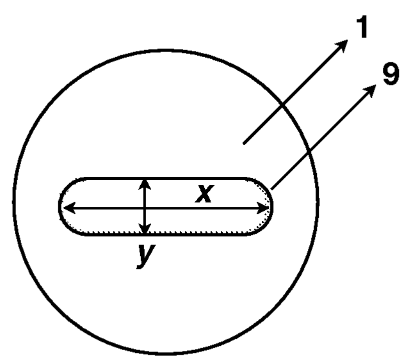

FIG. 4*a* shows mirror 3 as being circular with center C and radius r where said mirror 3 has chord-defined segments removed from two edges where the chords are parallel and distance X apart, where X<2r, or equivalently, X is smaller than the diameter of the circular mirror 3. FIG. 4*b* shows a bottom view of the substantially spherical and transparent front hard shell 1 with break-line 9 characterized by a width greater than chord separation X to allow passage through of the mirror with segments removed, and height y equal to the length necessary for the mechanism to fit through.

With reference to FIGS. 5*a*, 5*b*, 5*c*, 5*d* and 6 the present invention relates to an alternative embodiment for a heliostat without a mechanical enclosure. According to FIG. 5*a* such an embodiment provides for a heliostat comprised of a steerable mirror 3 contained within a mirror holder 13, said steerable mirror 3 comprised of a reflective surface and a non reflective photovoltaic surface 12, said steerable mirror 3 is rotatably mounted within a forked-mount 4 comprised of two arcuate arms and a substantially vertical axle 5, with a mirror-motor contained within casing 6*a* and optionally a second mirror-motor contained within casing 6*b* mounted each at one of the ends of the opposing arms of the forked-mount 4, a sensing system 7, a semi-circular arcuate slider 8 and a base 9 containing a pin 18 for the mounting of an additional extending arm, and a removable part 11.

Figure 5A:
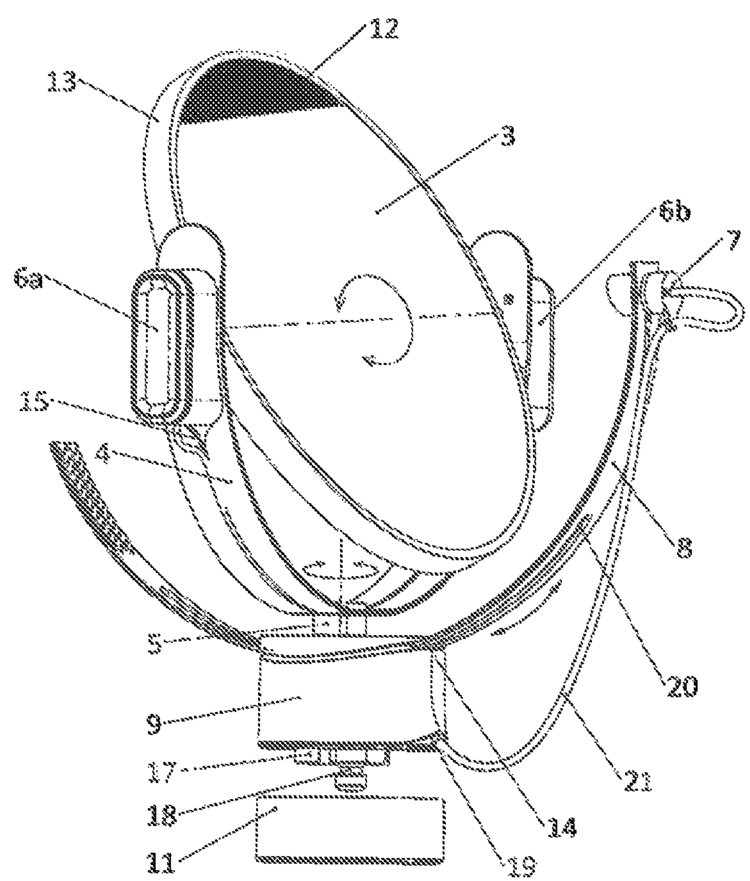
FIGS. 5*a*-5*d* depict a number of views of the heliostat with 5*a* representing a frontal side view, 5*b* a rear side view, 5*c* a rear side view with the slider extended to one extreme limiting position and 5*d* a rear view with the slider extended to the other extreme limiting position.

With reference to FIG. 5*a*, a front lateral view is shown whereby a mechanical steering mechanism is comprised of motor contained within casing 6*a* and a second optional motor contained within casing 6*b*, said casing 6*b* containing the electronics to support a touch button and a rotational encoder, one of the two casings being placed at the top of each of the two fork tines comprising fork mount 4, and a motor contained within base 9. The motor(s) and the touch button and encoder electronics contained in casings 6*a* and 6*b* are connected to the steering control system contained in base 9 by wire 15 that runs from the top of each fork tine of mount 4 into a hollow shaft contained within axle 5 and into the base 9.

Figure 5B:
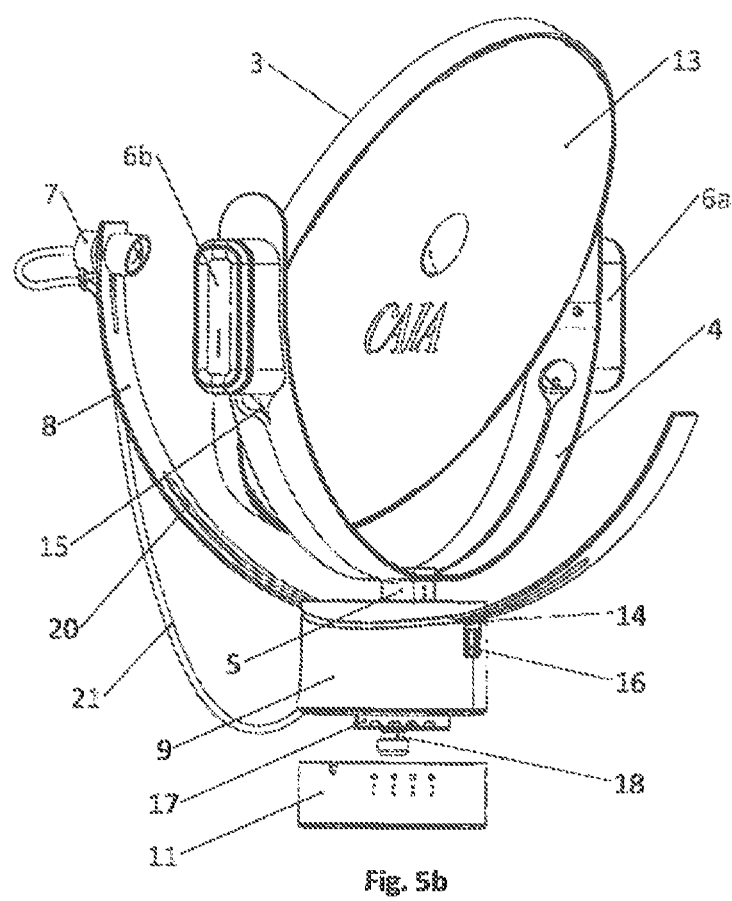

With reference to FIG. 5*b*, mirror holder 13 snaps steering mirror 3 into place protecting it and carrying the company's logo. A slot 20 runs along the middle of slider 8 that is held within base 9 by tracks evidenced by slot 14 so that slider 8 is allowed to move within base 9 in a sliding motion caused by the user who can in this way manually position the sensing system 7 placed at the very end of slider 8 for accurate targeting, to reach the desired height. Once the desired height is reached, rotation of the clamp handle 16 by the user allows the user to fasten and clamp slider 8 into a fixed position which in turn allows the target pointing to stay fixed and accurate until clamp handle 16 is loosened.

With reference to FIGS. 5*a* and 5*b* base 9 is comprised of a removable section 11 that once removed grants the user access to a WiFi module slot 17 contained within base 9 that can be manually added by the user, as well as a pin 18 where the latch of an extendable arm can be attached in order to fix the entire device to a different surface or simply increase its reach.

Figure 5C:
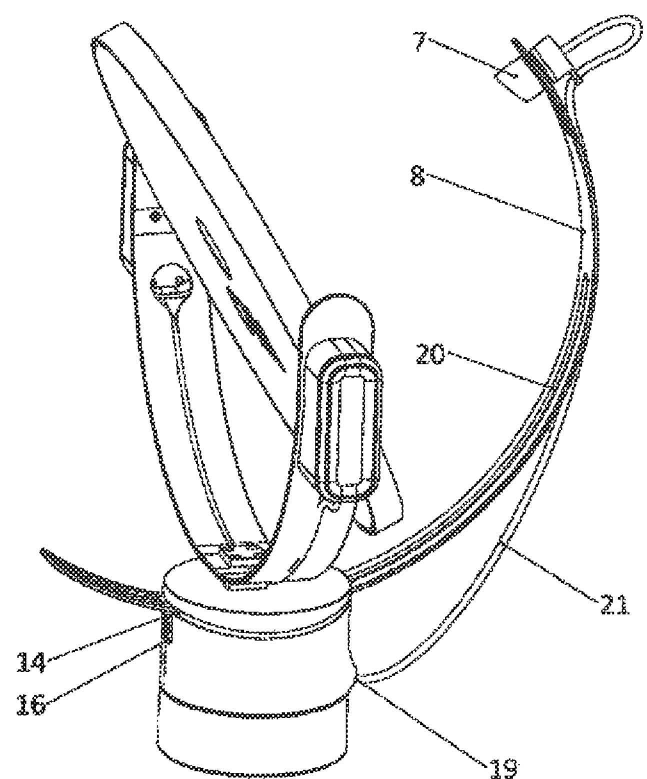

With reference to FIG. 5*c*, sensing system 7 is positioned at its highest attainable height due to slider 8 being fixed through clamp handle 16 all the way up until the end of slot 20 that is farthest from sensing system 7, this position also being guaranteed by the extent reachable by cable 21 that connects the steering control system placed in base 9 to the sensing system 7, said cable entering base 9 through a flap 19 placed below arcuate slot 14 through which the slider 8 passes through base 9.

Figure 5D:
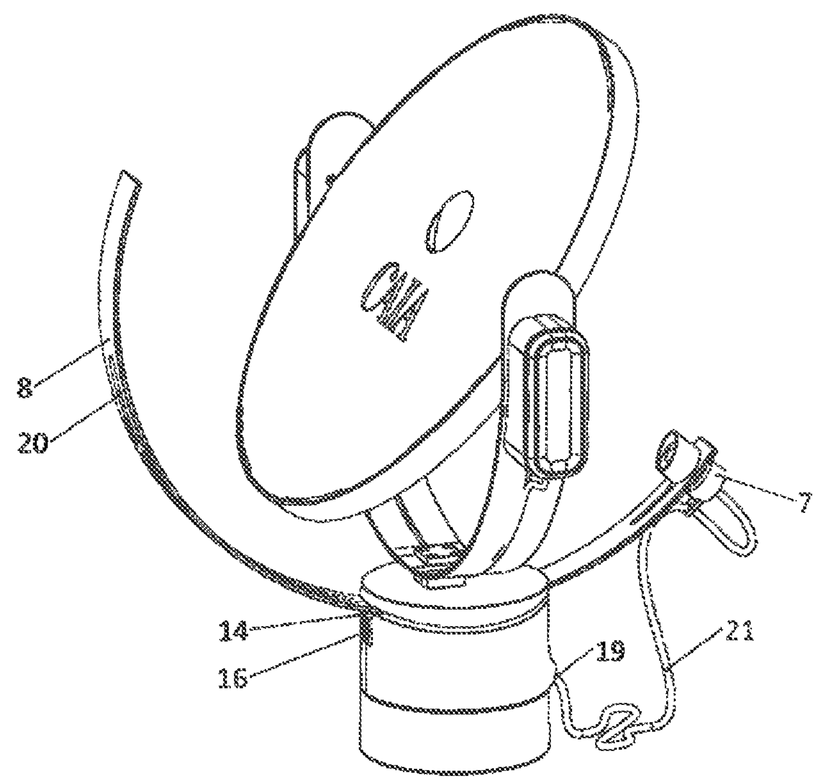

With reference to FIG. 5*d*, sensing system 7 is positioned at its lowest attainable height due to slider 8 being fixed through clamp handle 16 positioned all the way down until the end of slot 20 that is closest to sensing system 7, this position being allowed by the flexure of cable 21 that connects the steering control system placed in base 9 to the sensing system 7.

Figure 6:
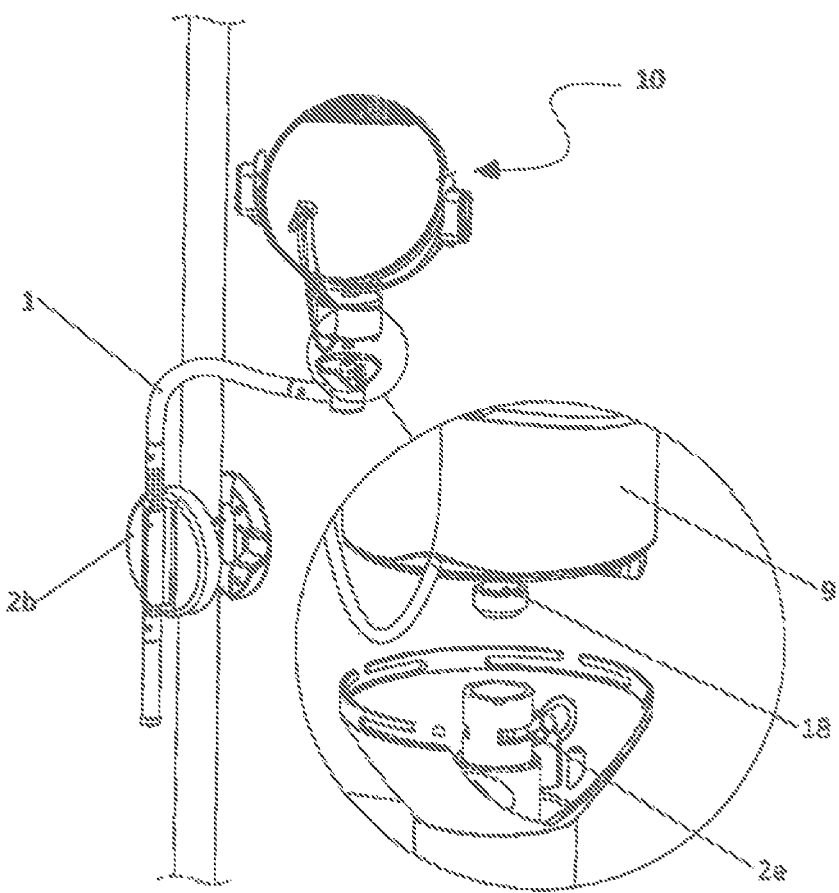
FIG. 6 depicts a frontal of the heliostat mounted on top of a mounting arm that allows the heliostat to increase its reach and the alternative surfaces on which it can be placed such as poles, railings, window-sills and walls.

In reference to FIG. 6, the heliostat device 10 is attached to an extendable mounting arm 1 comprised at one end of a latch 2*a* to latch onto pin 18 contained within base 9, after removable part 11 has been detached from base 9 through a snapping or rotational motion, and at the other end of a clamp or wall mount 2*b* that allows the entire system comprised of the heliostat device 10 and the mounting arm 1 to be safely fixed to alternative surfaces such as a pole, a railing, a window-sill or a wall.

Figure 7:
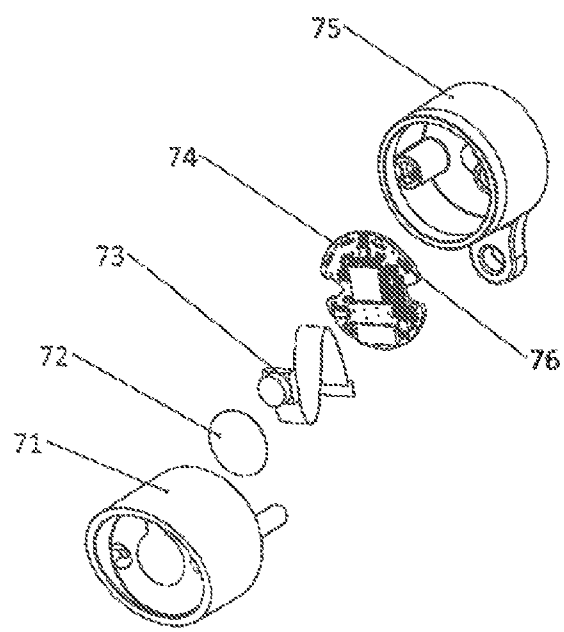
FIG. 7 depicts an exploded view of the steering control sensor and covers and the components contained within.

In reference to FIG. 7, the elements of sensing system 7 are shown in an exploded view that depicts a housing front 71 and a housing back 75 between which a filter 72 is placed to reduce the amount of light that camera 73 behind filter 72 receives, said camera 73 being attached to an electronic controlling system 74. On electronic controlling system 74, outward-facing light sensors 76 (UV, IR or visible spectrum) are distributed radially preferably equi-angularly around the perimeter of electronic control system 74 and contained within sensing system 7 to allow for pre-alignment adjustments. The housing is transparent in at least those portions needed to allow external light directly to reach the light sensors, the transparency optionally being provided by transparent windows [not shown] for each light sensor.

As used in this specification and in the appended claims, the singular forms include the plural forms. For example the terms "a," "an," and "the" include plural references unless the content clearly dictates otherwise. Additionally, the term "at least" preceding a series of elements is to be understood as referring to every element in the series. The inventions illustratively described herein can suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the future shown and described or any portion thereof, and it is recognized that various modifications are possible within the scope of the invention claimed. Thus, it should be understood that although the present invention has been specifically disclosed by preferred embodiments and optional features, modification and variation of the inventions herein disclosed can be resorted by those skilled in the art, and that such modifications and variations are considered to be within the scope of the inventions disclosed herein. The inventions have been described broadly and generically herein. Each of the narrower species and subgeneric groupings falling within the scope of the generic disclosure also form part of these inventions. This includes the generic description of each invention with a proviso or negative limitation removing any subject matter from the genus, regardless of whether or not the excised materials specifically resided therein. In addition, where features or aspects of an invention are described in terms of the Markush group, those schooled in the art will recognize that the invention is also thereby described in terms of any individual member or subgroup of members of the Markush group. It is also to be understood that the above description is intended to be illustrative and not restrictive. Many embodiments will be apparent to those of in the art upon reviewing the above description. The scope of the invention should therefore, be determined not with reference to the above description, but should instead be determined with reference to the appended claims, along with the full scope of equivalents to which such claims are entitled. Those skilled in the art will recognize, or will be able to ascertain using no more than routine experimentation, many equivalents to the specific embodiments of the invention described. Such equivalents are intended to be encompassed by the following claims.

What is claimed is:

1. A heliostat comprising:

(a) a steerable mirror;

(b) a mechanical mirror-steering mechanism;

(c) a steering control-system;

(d) a steering-control sensor;

(e) a sliding mechanism, wherein the sliding mechanism comprises a semicircular arcuate slider that may be manually adjusted to alter the height of the steering control sensor to allow for easy target pointing setup by a user; and (f) a base.

2. The heliostat of claim 1, further comprising a cable which connects a sensing system, wherein the cable is placed at the top of the slider.

3. The heliostat of claim 1, further comprising a slot that runs along part of a centerline of the slider that allows for the cable to move within the slot.

4. The heliostat of claim 1, wherein the mechanical mirror-steering mechanism is a forked member comprising a vertical axis that runs perpendicular to the ground and two arcuate opposed arms.

5. The heliostat of claim 4, wherein the two arcuate opposed arms hold a motor at a topmost position that enables a tilting motion of the steerable mirror.

6. The heliostat of claim 4, wherein the steerable mirror is of a circular shape that is positioned within the forked member of the mechanical mirror-steering mechanism.

7. The heliostat of claim 1, wherein the steerable mirror sits within a holder.

8. The heliostat of claim 7, wherein the steerable mirror holder is rotatably mounted about two axes that intersect at or near the mirror's geometric center.

9. The heliostat of claim 7, wherein the steerable mirror holder is mounted such that the steerable mirror's reflective surface over a major portion of its steerable rotatable position range faces a photosensitive active part of the steering-control sensor.

10. The heliostat of claim 1, wherein the heliostat is electrically self-powered.

11. The heliostat of claim 10, wherein one or more photovoltaic cells are mounted on the heliostat to provide a power source.

12. The heliostat of claim 11, wherein the one or more photovoltaic cells are co-mounted with the steerable mirror so as to always face the sun when the heliostat is in normal operation.

13. The heliostat of claim 11, wherein the one or more photovoltaic cells are mounted behind an unsilvered portion of the mirror.

14. The heliostat of claim 1, wherein the steerable mirror moves in at least two axes of motion, wherein each axis is substantially perpendicular to the other while intersecting substantially at the steerable mirror's center.

15. The heliostat of claim 1, wherein the steering-control sensor comprises a front cover and a back cover, or a left cover and a right cover, or a top cover and a bottom cover.

16. The heliostat of claim 15, further comprising a camera.

17. The heliostat of claim 16, wherein a surface of the cover is fitted with an optically transparent aperture, which allows light to reach the camera.

18. The heliostat of claim 16, wherein the camera comprises a photosensitive surface and an electronics control system positioned behind the photosensitive surface of the camera and enclosed within at least one cover.

19. The heliostat of claim 18, wherein the electronics control system comprises a microprocessor and light sensors.

* * * * *